Sept. 2, 1958    S. MESSERSCHMIDT    2,849,842
GRINDING MACHINES

Filed Feb. 7, 1955    3 Sheets-Sheet 1

INVENTOR
SEBASTIAN MESSERSCHMIDT
BY Paul M. Craig, Jr.
ATTORNEY.

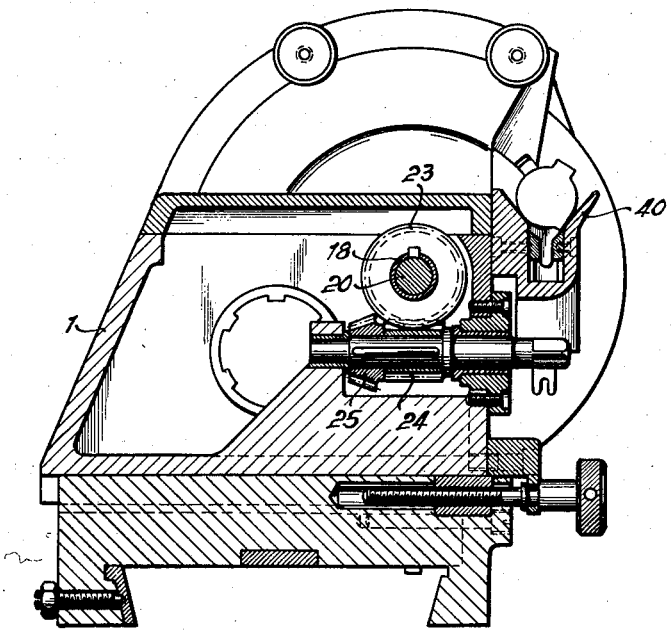

Sept. 2, 1958 S. MESSERSCHMIDT 2,849,842
GRINDING MACHINES

Filed Feb. 7, 1955 3 Sheets-Sheet 3

INVENTOR
SEBASTIAN MESSERSCHMIDT
BY Paul M. Craig, Jr.
ATTORNEY.

United States Patent Office 2,849,842
Patented Sept. 2, 1958

2,849,842

GRINDING MACHINES

Sebastian Messerschmidt, Schweinfurt, Germany

Application February 7, 1955, Serial No. 486,521

Claims priority, application Germany February 16, 1954

13 Claims. (Cl. 51—105)

The present invention relates to a grinding machine and in particular to a machine with automatic feed and removal of the workpieces.

Hitherto the workpieces to be ground were clamped in the chuck of the machine by hand. In spite of all care, it frequently happened that the workpieces were not true chucked but canted.

As, however, accurate concentric running of the workpieces is absolutely essential for perfect grinding, any canted workpieces must be trued up.

In order to prevent canting and therefore the necessity of truing up the workpieces by hand, it has been proposed to hold the workpieces in a magnetic chuck.

If it is a question of grinding large quantities of identical mechanical parts, these grinding machines with magnetic chucking devices were equipped with an automatic feeding device, with the result that the work is to a great extent independent of the skill of the operator. These machines, although the workpieces are chucked concentrically, do not give satisfaction because it is impossible to prevent the workpieces from becoming magnetic. Such magnetized workpieces are unsuitable for use, particularly in the case of ball bearings. Consequently it must be endeavored to produce a grinding machine having a chuck which sets up the workpieces mechanically and not magnetically and at the same time to provide an arrangement for feeding and removing the workpieces.

This is attained according to the invention in that a diaphragm chuck is used which is actuated by a cam-controlled device and to and from which the workpieces are fed and removed by means of a mechanical feeding arrangement, likewise cam-controlled.

The operating mechanism preferably consists of an axially shiftable hollow shaft passing through the chuck spindle and provided with a ram actuated by a lever engaging the hollow shaft and oscillatable as the spindle head and grinding wheel move apart, the diaphragm chuck being provided with an ejector pin which is mounted on an ejector rod extending through and longitudinally shiftable in the hollow shaft and controlled by a main cam shaft.

The oscillatable lever preferably bears at one end against a fixed point of the spindle through the intermediary of a cam mounted on the ejector rod and at the other end against a cam surface provided on the machine frame through the intermediary of a roller, this cam surface being so shaped that by its displacement relatively to the spindle head the push rod is shifted and effects the opening or closing of the diaphragm chuck.

The workpiece feeding arrangement preferably consists of a rotatable disk which receives the workpieces from a magazine, a feeding member pushing the workpieces into the diaphragm chuck and an ejector removing the ground workpieces from the rotatable disk.

For feeding and ejecting the workpieces the feeding member and ejector are, according to another feature of the present invention, slidable relatively to the rotatable or revolver disk in the axis of rotation thereof, the sliding movement being controlled from the cam shaft. At the same time the revolver disk is mounted on the spindle head preferably by means of a hollow shaft on which an axle carrying the feeding member and the ejector is slidable.

In order to impart a rotary movement to the revolver disk upon displacement of the ejector and the feeding member and to enable the revolver disk to be driven by the spindle, the revolver disk can, according to another feature of the present invention, be driven from the chuck driving spindle by a gear capable of being engaged and disengaged through the intermediary of a pin clutch controlled from the cam shaft.

Other advantages and feaures will be explained in connection with the embodiment of the invention hereinafter described with reference to the accompanying drawings, in which:

Fig. 1 is a partial longitudinal vertical cross-sectional view of the grinding machine in accordance with the present invention taken along line I—I of Figure 5;

Fig. 2 is a section on line II—II of Fig. 4;

Fig. 3 is a section on line III—III of Fig. 2;

Fig. 4 is a section on line IV—IV of Fig. 1;

Figure 5:
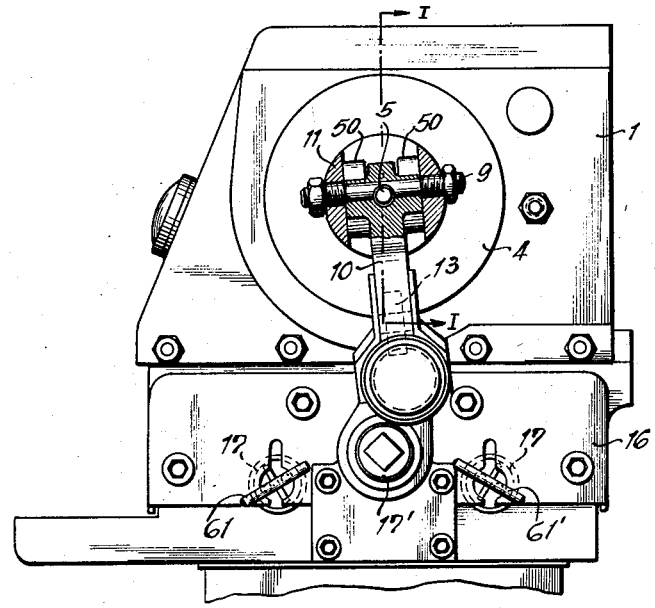
Fig. 5 is a section on line V—V of Fig. 1.

Referring now to the drawing wherein like reference numerals are used throughout the various views thereof to designate like parts, reference numeral 1 designates a housing which accommodates a spindle 2. The spindle 2 carries at the front end thereof a chuck 3, shown in Figure 1 as a diaphragm chuck of conventional construction. A pulley 4 (Figure 1) is keyed to the spindle 2 and connected therewith, for example, by a set screw 4' to effect the rotation of the spindle 2 upon rotation of the pulley 4 which may be driven in any suitable manner.

An ejector rod 5 extends through the spindle 2 and is itself surrounded by a hollow shaft 6 which is disposed concentrically to and between the ejector rod 5 and the hollow spindle 2. The hollow shaft 6 carries at the front end, i. e., at the right end as viewed in Figure 1, a ram 7 consisting of a rod with a flange-like member that is suitably secured to the front end of the hollow shaft 6.

An ejector pin 8 is suitably secured to a hub-like member 8' which surrounds the front end of the hollow shaft 6. The member 8' is secured for common movement with the ejector rod 5 by means of a cross pin 5' which moves in slots 6' and 6" provided in the hollow shaft 6 to enable relative axial movement between the ejector rod 5 and the hollow shaft 6 and therewith between the ejector pin 8 and the ram 7, respectively.

The shaft 20 (Figures 2 and 3) which extends essentially parallel to the spindle 2 is suitably journalled in housing 1 to the right side of spindle 2 as viewed in Figure 4. A strap 29 (Figure 2) is fixed to the shaft 20 and operatively engages the ejector rod 5 (Figure 1). Consequently, when the shaft 20 is shifted axially, the ejector rod 5 is also displaced axially simultaneously therewith through the intermediary of the strap 29.

An eccentrically mounted lever 10 is pivotally supported on a bolt 9 carried by a bracket 11 (Figures 1 and 5). The bracket 11 is mounted on the spindle 2 by means of a ball bearing 12 (Figure 1). Consequently, when the eccentrically mounted lever 10 is swung or pivoted about its pivot bolt 9, the hollow shaft 6 is shifted relatively to the spindle 2 by the engagement of rollers 50 (Figures 1 and 5) with the flange 6''' of the hollow shaft 6. The hollow shaft 6 carries at its other end the ram 7, as pointed out above, which bears against the diaphragm chuck 3 and opens the same as the ram 7 is moved toward the right as viewed in Figure 1 against the diaphragm 3' of chuck 3.

The eccentrically mounted lever 10 also carries at the lower part thereof a roller 13 (Figure 1) which cooperates with a cam surface 14 provided on an adjustable bolt member 14' which is threaded to the machine frame. The cam surface 14 is adjustable in the effective length thereof by a turning of member 14' which is locked in adjusted position by means of a knurled nut 15.

The housing 1 rests on a carriage 16 which itself is slidable on the machine frame in the direction of the spindle 2 and is under the influence of springs 17 and 17' (Figure 5) provided on each side of the center longitudinal plane of the carriage 16. The springs 17 and 17' (Figure 5) are hooked onto the carriage 16 at one end thereof by means of cross pins 61 and 61' and to a stationary point of the machine frame at the other end thereof. A dovetail connection 16' between the housing 1 which houses the spindle assembly and the carriage 16 enables the former to move relatively to the latter in a direction transverse to the axis of the spindle 2 while assuring unitary movement thereof in the axial direction of spindle 2. The springs 17 and 17' (Figure 5) tend to pull the carriage 16 and therewith the housing 1 in the direction of the arrow A (Figure 1). The carriage 16 comprises two slidably connected relatively adjustable parts 16" and 16'". Adjustment between these parts is effected by means of a threaded member 17'", one end of which is journaled in part 16'" and the shank of which threadedly engages a threaded part depending from part 16". Lock nut 17" serves to maintain the parts 16" and 16'" in selected adjusted position.

A revolver disk 19 provided with apertures for purposes more fully described hereinafter is supported on a hollow shaft 18 (Figures 2 and 4) which slidably receives therein the shaft 20 and which is also suitably mounted in the housing 1.

The shaft 20 carries an ejector plate 21 at the right end thereof (Figure 2) which is provided with an appropriately shaped aperture to receive the feeding member 22. The feeding member 22 is formed by a ring portion 22' which is fastened to the ejector plate 21 by screws (not shown) and the fingers 22" which are part of the feeding member 22 extend through the aperture in the ejector plate 21 and serve as feed members for inserting the workpieces 41 into the chuck 3. The ejector plate 21 as shown in Figures 2 and 7 also carries an ejector pin 21' which is provided with a head which performs the function of pushing out a finished workpiece 4' from one of the apertures in the revolver disk 19. This occurs at the same time that the feeding member 22 performs the workpiece inserting operation just referred to. The operation of the ejector plate including feeding member 22 and ejector pin 21' is described in detail hereinafter.

A worm wheel 23 is keyed to the shaft 18 (Figures 2 and 3) and meshes with a worm 24 rigidly connected to a bevel gear 25 (Figure 3) in mesh with another bevel gear 26 arranged on the spindle 2. The bevel gear 26 may be selectively coupled with the spindle 2 as will appear more fully hereinafter.

Figure 6:
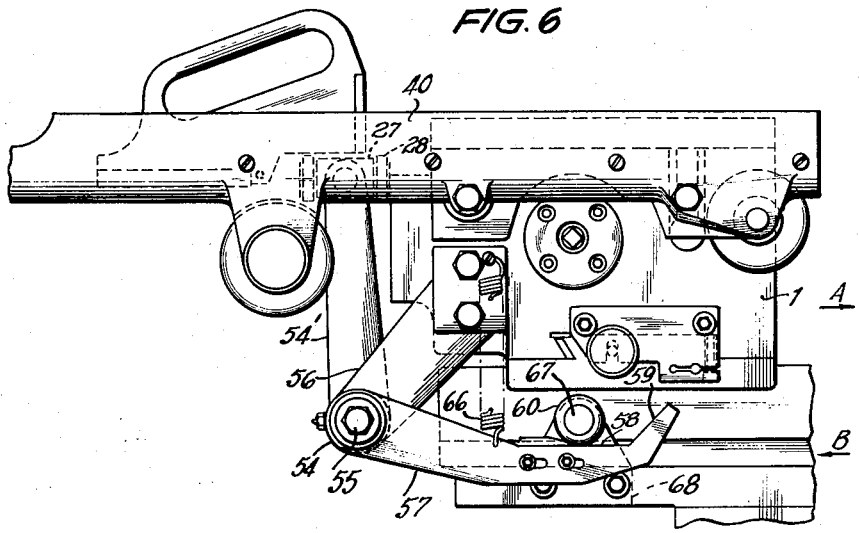
Fig. 6 is a rear elevation of Fig. 1.

The shaft 20 is actuated for axial movement by entrainment members 28 threadably secured thereto and is movable by means of a sleeve 27 (Figure 2). The sleeve 27 is attached to the arm 54' of a bell crank 54 (Figure 6) the fulcrum 55 of which is supported through an arm 56 to the housing 1. The other arm 57 of the bell crank 54 includes a straight surface 58 and a cam surface 59 at its end. The straight surface 58 of lever arm 57 is held in contact with a roller 60 by the spring 66. The roller 60 is rotatably mounted on a pin 67 which in turn is connected to a bracket 68. This bracket 68 in turn is mounted on the stationary machine frame. Another sleeve 27' is secured to the shaft 20, for example, by threads, and serves for simultaneously operating the strap 29 which engages the end of the ejector rod 5 as pointed out above.

The bevel gear 26 is secured to a specially shaped member 70 (Figures 1 and 4), for example, by means of bolts 70'. The member 70 and therewith the bevel gear 26 are rotatable on a sleeve 30 provided between the internal bore of the member 70 and the spindle 2. The member 70 and therewith the bevel wheel 26 are adapted to be selectively coupled to the spindle 2 in the following manner.

A coupling member 31 is pivotally supported at the member 70 in any suitable manner, for example, in an appropriately shaped bracket fixedly secured to member 70 and shown in dot-dash lines in Figure 4, as indicated by reference numeral 31". The coupling member 31 is provided with a finger portion 31', an indexing member 32 and a nose portion 33. When the coupling is in a disengaged position, the nose portion 33 rests on the abutment 34 which forms part of a blade-like lever 35 mounted on a bolt 36 and acted upon by a tension spring 37' normally tending to rotate the lever 35 in the counterclockwise direction as viewed in Figure 2.

An abutment member 35' is suitably secured by a cross pin 35" to the nut 26' which is slidably arranged within the bore 51 of the shaft 20. The cross pins 35" pass through the slots 20' and 20" in the shaft 20 and it is seen from Figure 2 that the assembly consisting of the nut 26', pin 35" and abutment member 35' is movable in relation to shaft 20 by means of the slots 20' and 20". The nut 26' is threadably connected with bolt 53 the outer end of which abuts the left end of shaft 20 as viewed in Figure 2. Upon movement of the abutment member 35' toward the right by the shaft 20, as viewed in Figure 2, the lever 35 is pivoted clockwise thereby liberating the nose portion 33 so that the indexing member 32 and therewith the coupling member 31 are pivoted clockwise by a pin 39 spring-loaded by a spring 38, both accommodated within the member 70, with the result that the finger portion 31' engages with an appropriately shaped lug or pin 2' forming part of the spindle assembly 2 thereby connecting the part 70 and therewith the bevel gear 26 with the spindle 2 for common rotation therewith through the intermediary of the coupling member 31 and the indexing member 32. Accordingly, when the spindle 2 rotates, the bevel gear 26 will also rotate. Before the members 26 and 70 can complete one revolution the lever 35 with its abutment 34 is returned to its original position as shown in Figure 2 by the spring 37'. The disengagement of lever 35 from the abutment member 35' is effected by a slight rotation of the abutment member 35' and a longitudinal groove 69 at its periphery for clearance of the return movement of lever 35. Then the nose portion 33 will come in contact again with the abutment 34 when the bevel gear 26 has completed one revolution thereby pivoting the indexing member 32 counterclockwise against the spring 38. As a result thereof, the pin 39 is again pushed inwardly in the cross bore provided in the member 70 and the finger portion 31' releases the pin 2' thereby causing disengagement of the coupling between the bevel gear 26 and the spindle 2 until the abutment member 35' once again actuates lever 35 to release the nose portion 33.

A cam shaft 62 (Figure 1) is provided with a cam 63 which is engaged by the follower 64 of a bell crank lever 65 suitably journalled in the stationary main frame of the machine (not shown). The bell crank lever 65 is provided with an arm portion 65' which engages the carriage 16 and moves it together with the complete spindle assembly to the left as viewed in Figure 1 in the direction of the arrow B against the spring forces of springs 17 and 17'.

The workpieces consist of rings 41 to be ground internally by a grinding wheel 71 suitably secured to the grinding spindle 72. The workpieces 41 are placed into a channel-shaped magazine 40 (Figure 6) and are under the action of a spring, not shown in the drawing, to provide a continuous feed thereof into an aperture of the revolver disk 19 and are, by rotation of the revolver disk, brought in front of the chuck 3. By the subsequent movement of the ejector plate 21 in the direction B, the fingers 22" of the feeding member 22 attached to the ejector plate 21, contact the face of the workpiece 41 for pushing it out of the aperture in the revolver disk 19 and into the chuck 3.

*Operation*

When the internal grinding operation of the workpiece consisting of a ring 41 held in the chuck is completed, the carriage 16 and therewith the entire spindle assembly is displaced in the direction of the arrow B through the intermediary of the cam shaft 62 and the bell crank 65, 65' as the follower 64 comes into engagement with the rising cam portion 63' whereby the entire spindle assembly moves away from the grinding wheel 71. During this movement the roller or cam follower 13 runs off the lower surface of the cam surface 14 onto the incline thereof. As a result, the eccentrically mounted lever 10 presses the hollow shaft 6 in the axial direction thereof toward the right as viewed in Figure 1 so that the ram 7 secured to the end thereof causes the diaphragm chuck 3 to open.

As the movement of the spindle assembly continues in the direction B (Figures 1 and 6) the bell crank 54 which is pivotally supported thereon participates in this movement until the cam surface 59 contacts roller 60 after which the bell crank begins to rotate in a clockwise direction against the tension of the spring 66. This results in a movement of the sleeve 27, shaft 20, ejector plate 21 attached to the end of shaft 20, and the feeding member 22 attached to the ejector plate 21 in the direction A. At the same time, the ejector pin 8 (Figure 1) secured to the ejector rod 5 through the hub-like member 8' and cross pin 5' are displaced in the same direction A toward the right as viewed in Figure 1 through the intermediary of the strap 29 which transmits the axial movement of the shaft 20 to the ejector rod 5. This movement of the ejector pin 8 causes the workpiece or ring 41 to be pushed out of the chuck 3 into the corresponding aperture provided in the revolver disk 19. As the finished ground ring 41 is being inserted into this aperture in the revolver disk 19 by the movement of shaft 20 and rod 5, the lever 35 is pivoted in the clockwise direction as seen in Figure 2 by the abutment member 35' which is connected to shaft 20 thereby liberating the nose portion 33 so that the member 70 and therewith the bevel gear 26 is effectively coupled with the spindle 2 as pointed out above and performs one revolution therewith. The shaft 20 is provided with appropriately shaped slots 20' and 20" through which the cross pin 35" extends so as to provide the desired lost motion before the shaft 20, in its movement in the direction of the arrow C, Figure 2, takes along the nut 26' and therewith the abutment member 35'. The nut 26' (Figure 2) which is slidably arranged in a bore 51 of shaft 20 is provided with an internally threaded portion 52 which engages with the threaded portion of a bolt 53. Pin 35", which passes through the slots 20' and 20" in shaft 20, connects the nut 26' with the abutment member 35'. The other end of bolt 53 abuts the end of shaft 20. By turning the bolt 53, axial adjustment of the abutment member 35' in relation to shaft 20 is effected which in turn effects a change in the timing of the release of the nose portion 33 by the abutment 34 during the axial movement of shaft 20 in the direction C of Figure 2.

As a result of the rotation of the bevel gear 26 the bevel gear 25 (Figure 3) meshing therewith is rotated so that, through the intermediary of the worm 24 and the worm wheel 23, the shaft 18 is rotated together with the revolver disk 19. The gear ratios are thereby so chosen that the total angle of rotation is such that an unground ring 41 placed in the revolver disk 19 is just brought into register opposite the chuck 3, and the finished ground ring 41 in the revolver disk 19 is brought just opposite the ejector pin 21'. As soon as the aperture in the revolver disk has thus reached the predetermined position relative to the chuck 3 which is reached when the bevel wheel 26 again comes to rest, the roller 64 (Figure 1) reaches the declining part of cam 63 and, consequently, the spindle assembly commences to move in the direction A under the tension of the springs 17 and 17'. As a result of this movement, the bell crank 54 (Figure 6) is also moved in the direction of A and is rotated in a counter-clockwise direction under the tension of spring 66 as a result of the engagement with the cam surface 58 or lever arm 57 moving away from the roller 60. This rotation is imparted onto lever 54' and as a result thereof sleeve 27, shaft 20 and the ejector plate 21 together with the feeding member 22 are commencing to move in the direction D as indicated in Figure 2. By this movement, the fingers 22" of the feeding member 22 push the new workpiece 41, which was brought here, out of its aperture in the revolver disk 19 and into the chuck 3, while by the same movement of the ejector pin 21', the finished workpiece, stored in the revolver disk 19, having been moved away from in front of the chuck 3 by the rotation of the disk 19, is pushed out of it.

By the same movement of the shaft 20 in the direction D, Figure 2, strap 29 moves with shaft 20 whereby the ejector rod 5 together with the ejector pin 8 is enabled to follow the movement of strap 29 as the workpiece 41 enters the chuck.

As the movement of the spindle assembly continues in the direction A, Figure 1, the cam follower 13 comes in contact with the inclined cam surface 14 and the eccentrically mounted lever 10 releases the hollow shaft 6 for movement towards the left as viewed in Figure 1, so that the ram 7 releases the diaphragm of the chuck 3 which causes it to close for firmly clamping the new workpiece 41 in position for grinding and the aforementioned sequence of operation thereupon commences anew once the workpiece has been finished ground.

I claim:

1. Grinding machine comprising in combination, a grinding wheel, a diaphragm chuck shiftable relatively to said grinding wheel, a mechanical cam-controlled actuating device for said diaphragm chuck including a driving spindle, a hollow shaft extending through and axially shiftable in said spindle, a ram carried by said hollow shaft for opening said diaphragm chuck and a lever engaging said hollow shaft and oscillatable during the relative displacement of said grinding wheel and said diaphragm chuck, and a mechanical cam-controlled workpiece feeding device operatively connected with said diaphagm chuck actuating device.

2. Grinding machine as set forth in claim 1, wherein an ejector pin is coordinated to the diaphragm chuck and is carried by an ejector rod extending through the hollow shaft and axially shiftable therein through the intermediary of cam means to push the workpieces out of the diagraph chuckh into the workpiece feeding device.

3. Grinding machine as set forth in claim 1, wherein the one arm of the oscillatable lever cooperates with an eccentric mounted on the spindle and bears against said hollow shaft whereas the other arm through the intermediary of a roller, bears against a cam surface provided on the machine frame, said cam surface being shaped so as to rock said lever to shift said hollow shaft with the ram to open and close respectively the diaphragm chuck during the relative displacement between the cam surface and the spindle assembly of the machine.

4. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from said revolver disk.

5. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from said revolver disk, said feeding member and ejector bolt being shiftable relatively to the revolver disk in the direction of the axis of rotation thereof, through the intermediary of cam means.

6. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from said revolver disk, said revolver disk being mounted on the spindle head of the machine by means of a hollow shaft in which a shaft carrying the feeding member and the ejector is slidably mounted.

7. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from said revolver disk, the revolver disk being driven by a gear of the chuck driving spindle capable of being engaged and disengaged.

8. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from said revolver disk, the revolver disk being driven by a gear of the chuck driving spindle capable of being engaged and disengaged by a coupling member controlled by said cam means.

9. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from said revolver disk, the revolver disk being driven by a gear on the chuck driving spindle, capable of being engaged and disengaged by an arrangement comprising a coupling member, a spring tending to maintain said coupling member in engaged position and an abutment cooperating with said spring, and an abutment member connected to the shaft of the feeding member and actuating said abutment to lock and release said coupling member.

10. Grinding machine as set forth in claim 1, wherein the workpiece feeding device comprises a magazine for the workpieces, a revolver disk cooperating with said magazine to receive the workpieces therefrom, a feeding member for inserting the workpieces into the diaphragm chuck and an ejector bolt for removing the finished ground workpieces from the revolver disk, the revolver disk being driven by a gear on the chuck driving spindle, capable of being engaged and disengaged by an arrangement comprising a coupling member, a spring tending to maintain said coupling member in engaged position and an abutment cooperating with said spring, an oscillatable lever carrying said abutment, a second spring maintaining said lever in locking position, an indexing member carried by said coupling member and provided with a nose portion cooperating with said abutment to lock said indexing member and maintain said coupling member in disengaged position, and an abutment member connected to the shaft of the feeding member and actuating said abutment to lock and release said coupling member.

11. Grinding machine as set forth in claim 1, wherein the cam control of the feeding device consists of a stationary roller, a feeding member shaft, control elements engaging on the one hand said stationary roller and on the other hand the feeding member shaft, said shaft being connected to an ejector rod of the spindle by means of a strap.

12. Grinding machine as set forth in claim 1, wherein the shifting of the spindle head away from the grinding wheel, the opening of the diaphragm chuck, the pushing of the workpieces out of the diaphragm chuck into the revolving disk, the turning of the revolver disk through one step, the running in of the feeding member and the pushing of the unground workpiece out of the revolver disk into the chuck, the ejection of the ground workpiece out of the revolver disk, the closing of the diaphragm chuck, the running out of the feeding member and ejector and the running of the spindle head towards the grinding wheel are effected by cam means.

13. A grinding machine with a grinding wheel, a spindle assembly with a workpiece chuck, said chuck having a diaphragm, means including a cam element for actuating said diaphragm to control said chuck, said chuck and said grinding wheel being movable the one relatively to the other, a first train of mechanical elements on said spindle assembly for automatically feeding work pieces to said chuck, and a second train of mechanical elements on said spindle assembly for automatically removing said workpieces from said chuck.

References Cited in the file of this patent

UNITED STATES PATENTS

| | | |
|---|---|---|
| 534,200 | Cook | Feb. 12, 1895 |
| 1,583,205 | Vanderbeek | May 4, 1926 |
| 1,841,809 | Heald | Jan. 19, 1932 |
| 1,926,959 | Quimby | Sept. 12, 1933 |
| 1,964,937 | Dumser | July 3, 1934 |
| 2,671,293 | Grobey | Mar. 9, 1954 |